(12) United States Patent
Lee

(10) Patent No.: US 7,466,360 B2
(45) Date of Patent: Dec. 16, 2008

(54) CCD CAMERA APPARATUS

(75) Inventor: Woon-ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 659 days.

(21) Appl. No.: 10/963,729

(22) Filed: Oct. 14, 2004

(65) Prior Publication Data

US 2006/0082680 A1    Apr. 20, 2006

(51) Int. Cl.
*H04N 5/225* (2006.01)

(52) U.S. Cl. .................. 348/373; 348/143; 348/372

(58) Field of Classification Search ............ 348/143, 348/207.99, 372–375; 248/187.1; 361/752, 361/825; D16/202
See application file for complete search history.

(56) References Cited

U.S. PATENT DOCUMENTS

| | | | |
|---|---|---|---|
| 5,221,964 A * | 6/1993 | Chamberlain et al. ....... | 348/373 |
| 5,381,176 A * | 1/1995 | Tanabe et al. ............... | 348/273 |
| 6,715,939 B2 * | 4/2004 | Ford ........................... | 396/427 |
| 6,956,610 B1 * | 10/2005 | Walls .......................... | 348/340 |
| 2003/0030748 A1 * | 2/2003 | Jung ........................... | 348/373 |
| 2006/0055819 A1 * | 3/2006 | Pokrovsky et al. .......... | 348/373 |
| 2006/0055820 A1 * | 3/2006 | Lyon et al. .................. | 348/373 |

* cited by examiner

*Primary Examiner*—Lin Ye
*Assistant Examiner*—Dennis Hogue
(74) *Attorney, Agent, or Firm*—Staas & Halsey LLP

(57) ABSTRACT

A CCD camera apparatus that can be used with both AC and DC power. The CCD, camera apparatus has: a casing having a zoom lens module installed therein; a lens holder installed in the casing, and supporting the zoom lens module; a DC power driving board supported on the lens holder; a CCD module connected to a first end of the zoom lens module; an AC/DC power driving unit selectively engaged with a first end of the lens holder in a detachable manner; and an end driving board detachably engaged to a first end of the AC/DC power driving unit, the end driving board being directly engageable to and disengageable from the first end of the lens holder when the AC/DC power driving unit is separated.

11 Claims, 4 Drawing Sheets

CCD CAMERA APPARATUS

BACKGROUND OF THE INVENTION

1. Field of the Invention

The present invention relates to a charge-coupled device (CCD) camera apparatus.

2. Description of the Related Art

Cameras using charge-coupled devices are generally used in high-security areas such as banks or parking lots.

Such a CCD camera has a front cap at a front end of a camera body casing, and a rear cap attached to a rear end. A zoom lens module, a CCD module, and a rear Printed Circuit Board (PCB) are sequentially installed in the casing from the front to the rear end. The zoom lens module is supported by a lens holder and fixed in the casing, and the CCD module is installed between the lens holder and the rear PCB.

The CCD camera, constructed as above, operates with AC or DC power supplied to the rear PCB. For use in an area generally using AC power, the CCD cameras use PCBs for AC power. Accordingly, the AC power is converted into DC power to drive the CCD camera.

For use in the area where DC power is generally used, the CCD cameras are provided with PCBs for DC power in the casing.

Because some places use AC power and other places use DC power, there are CCD cameras available for use with AC power and DC power, respectively. This limits the profits of the manufacturers, whose productivity and flexibility for dealing with the rapidly-changing market demands are both reduced because they have to make CCD cameras for AC power and DC power, separately. Furthermore, due to the requirements for assembly lines and works for each type of CCD camera, manufacturing costs increase.

SUMMARY OF THE INVENTION

Accordingly, the present general inventive concept has been made to solve the above-mentioned and/or other problems, and an aspect of the present general inventive concept is to provide an improved type of CCD camera that can be adaptively used with both AC and DC power.

The above aspects and/or other features of the present invention can substantially be achieved by providing a CCD camera apparatus for use with AC and DC power, comprising a casing having a zoom lens module installed therein, a lens holder installed in the casing, and supporting the zoom lens module, a DC power driving board supported on the lens holder, a CCD module connected to a first end of the zoom lens module, an AC/DC power driving unit selectively engaged with a first end of the lens holder in a detachable manner, and an end driving board detachably engaged to a first end of the AC/DC power driving unit, the end driving board being directly engageable to and disengageable from the first end of the lens holder when the AC/DC power driving unit is removed.

According to one aspect, the AC/DC power driving unit comprises a housing assembled to the lens holder, an AC/DC power driving board disposed in the housing, and electrically connected with the end driving board, the AC/DC power driving board converting AC power supply into DC power, and a housing cover engaged to a first end of the housing in a manner that covers the AC/DC power driving board, and supporting the end driving board.

According to one aspect, the lens holder comprises a first support bracket; and a second support bracket oppositely engaged with the first support bracket, the first and the second support brackets surrounding an outer side of the zoom lens module and supporting the zoom lens module, the first and the second support brackets each comprising a first fastening part to fasten the AC/DC power driving unit, and a second fastening part to fasten the end driving board.

According to one aspect, the end driving board has a shared screw hole to selectively fasten the end driving board to one of the second fastening part or the AC/DC power driving unit, using a screw.

According to one aspect, the housing cover comprises a first screw fastening part to screw-fasten with both the housing and the AC/DC power driving board altogether, and a second screw fastening part to screw-fasten with the end driving board.

According to one aspect, the housing cover comprises a pair of support protrusions determining a position of the end driving board and holding the end driving board in position; and the end driving board has a pair of support holes corresponding to the support protrusions.

According to one aspect, the first and the second support brackets each comprises a plurality of protruding supports determining position of one of the end driving board or the AC/DC power driving unit, and also holding one of the end driving board or the AC/DC power driving unit in position. The end driving board and the AC/DC power driving unit respectively have a plurality of support holes corresponding to the protruding supports.

According to one aspect, the AC/DC power driving unit comprises a plurality of supporting protrusions corresponding to the support holes of the rear driving board.

According to one aspect, the casing comprises a casing body having open first and second sides, a lens casing engaged with the lens holder in a manner that covers the first side of the casing body, with a lens of the lens module being exposed through the lens casing, and an end casing engaged with the second side of the casing body, the end casing being selectively engageable to both the lens holder and the AC/DC power driving unit.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings, of which.

DETAILED DESCRIPTION OF THE PREFERRED EMBODIMENTS

Figure 1:
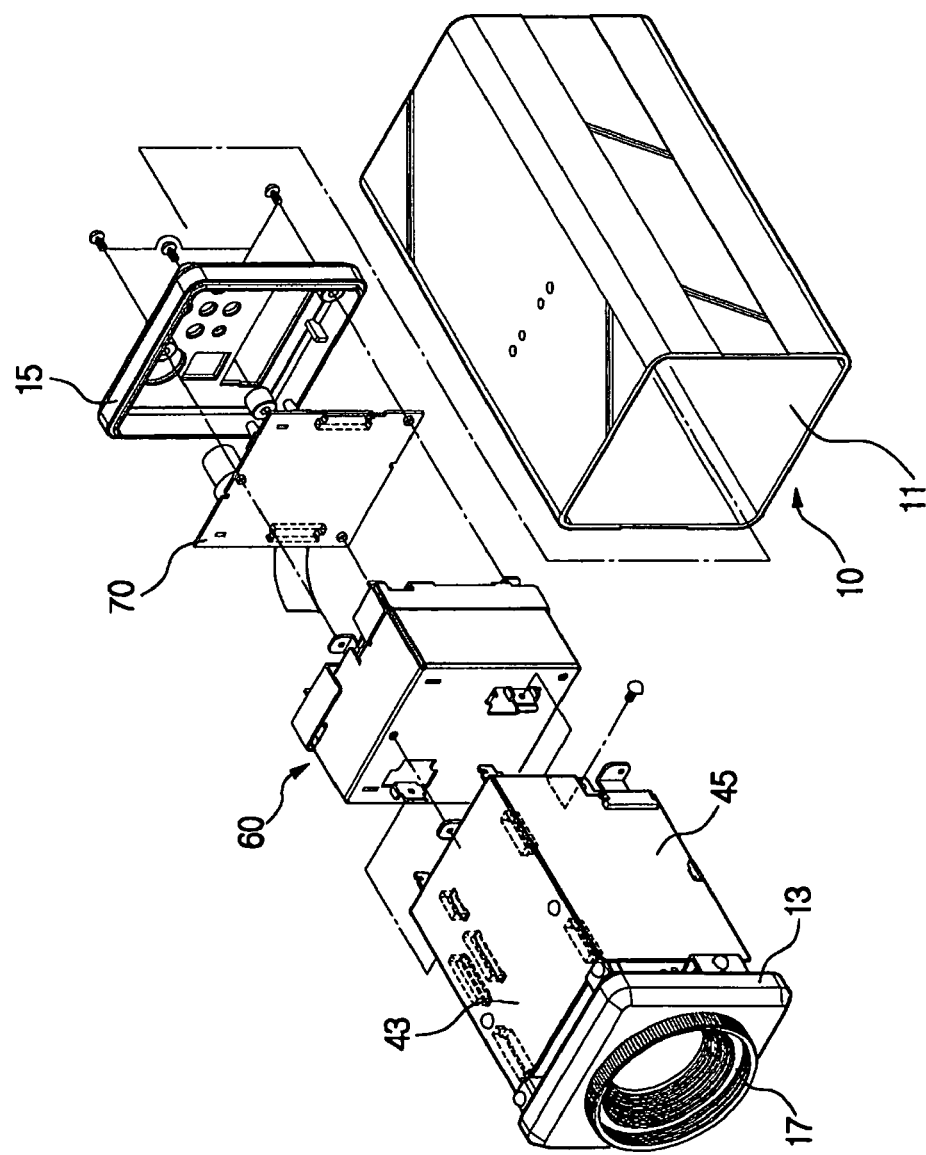
FIGS. 1 and 2 are perspective views illustrating a CCD camera apparatus according to an embodiment of the present invention prior to assembly.

Reference will now be made in detail to embodiments of the present invention, examples of which are illustrated in the accompanying drawings, wherein like reference numerals refer to the like elements throughout. The embodiments described below explain the present invention by referring to the figures.

In the following description, same drawing reference numerals are used for the same elements even in different drawings. Matters defined in the description, such as detailed construction and elements, are provided to assist in a comprehensive understanding of the invention. Thus, it is apparent that the present invention can be carried out without those defined matters. Also, well-known functions or constructions are not described in detail, since they would obscure the invention in unnecessary detail.

Figure 2:
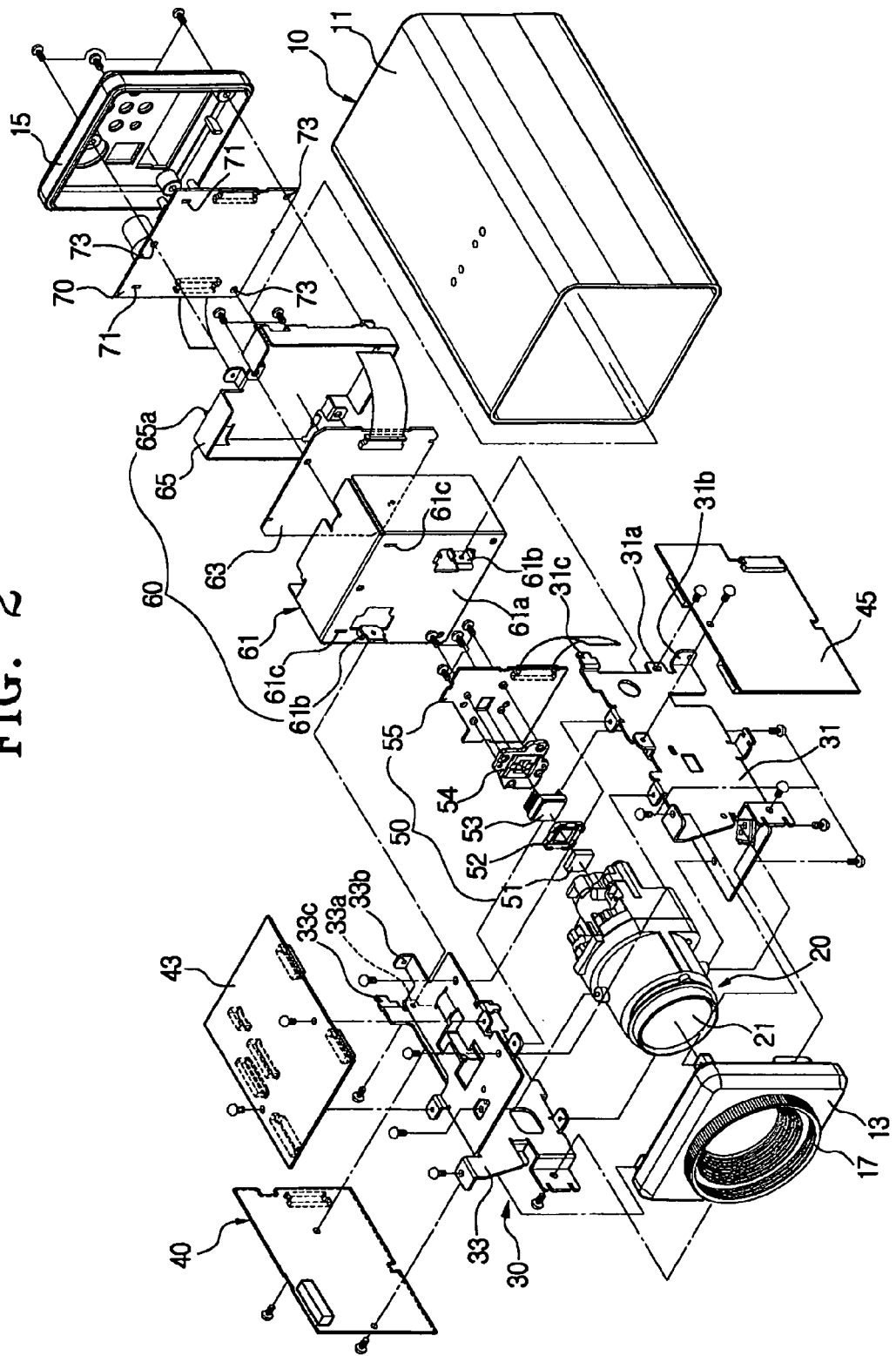

Referring to FIGS. 1 and 2, a CCD camera apparatus according to one embodiment of the present invention includes a casing 10, a zoom lens module 20 installed in the casing 10, a lens holder 30 supporting the zoom lens module 20 and installed in the casing 10, a DC power driving board 40 supported on a side of the lens holder 30, a CCD module 50 installed at a rear end of the zoom lens module 20, an AC/DC power driving unit 60 detachably engaged to rear end of the lens holder 30, and a rear (or end) driving board 70 engaged to a rear end of the AC/DC power driving unit 60.

The casing 10 has a casing body 11 which takes on the configuration of a cylinder with open front and rear sides, a front (or lens) casing 13 engaged to the front of the casing body 11, and a rear (or end) casing 15 engaged to the rear side of the casing body 11. A lens cap 17 is also engaged to the front casing 13.

According to one aspect, the zoom lens module 20 is a single assembly that includes a zoom les 21 therein, and is installed inside the casing 10. The zoom lens module 20 is supported by the lens holder 30, which surrounds the zoom lens module 20. Detailed description of the zoom lens module 20 will be omitted for the sake of brevity, as this is generally known in the art.

The lens holder 30 has first and a second support brackets 31 and 33 which are engaged with each other in a substantially symmetrical manner. The first support bracket 31 surrounds supports left and lower sides of the zoom lens module 20, and the second support bracket 33 surrounds and supports right and upper sides of the zoom lens module 20. The support brackets 31 and 33 are engaged with each other by screws. The front casing 13 is also engaged to the first and the second support brackets 31 and 33 by screws.

The DC power driving board 40 is engaged to a sidewall of the second support bracket 33. Being electrically connected with the rear driving board 70, the DC power driving board 40 directly receives DC power supply via the rear driving board 70 and transports the received power to drive respective electric parts. A lens driving circuit board 43 to control the driving of the zoom lens module 20 is installed on an upper wall of the second support bracket 33. Additionally, a DSP circuit board 45 is engaged to a sidewall of the first support bracket 31. The DSP circuit board 45 has the function of processing video signals.

The support brackets 31 and 33 include first fastening parts 31a and 33a to engage the AC/DC power driving unit 60, and second fastening parts 31b and 33b to engage the rear driving board 70. The support brackets 31 and 33 also include support protrusions 31c and 33c to both position and hold the rear driving board 70 during assembly. The support protrusions 31c and 33c align the AC/DC power driving unit 60 when the AC/DC power driving unit 60 is being assembled, and prevent movement after the AC/DC power driving unit 60 is firmly assembled.

The CCD module 50 is engaged to the rear side of the zoom lens module 20. A generally-available CCD module 50 may be used. The CCD module 50 includes, in order from front to rear, an optical low pass filter (OLPF) 51, a CCD spacer 52, a CCD element 53, a CCD support plate 54, and a CCD element driving circuit board 55, being respectively engaged with each other.

Figure 3:
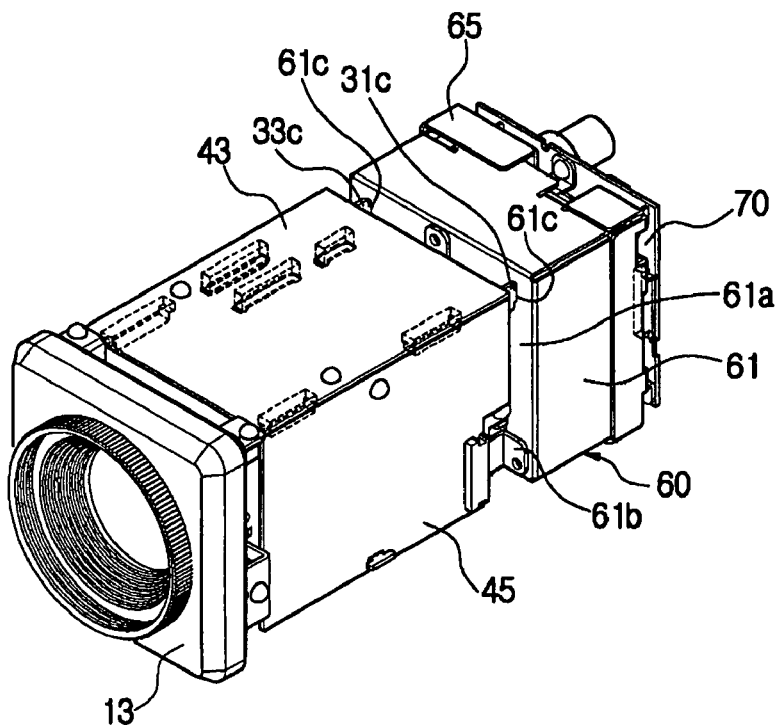
FIG. 3 is a perspective view illustrating the CCD camera apparatus being assembled.

The AC/DC power driving unit 60 operates to convert AC power into DC power and provides the DC power so that the camera apparatus can be used in places where DC power is not available. The AC/DC power driving unit 60 includes a housing 61 engaged to the rear end of the lens holder 30, an AC/DC power driving board 63 engaged within the housing 61, and a housing cover 65 engaged to the rear end of the housing 61. The housing 61 takes on the configuration of a cabinet that has an open rear side. A pair of engagement parts 61b are protruded from a front sidewall 61a of the housing 61 to fasten to the first fastening parts 31a and 33a of the support brackets 31 and 33, using screws. A pair of support holes 61c are located in the front sidewall 61a, to receive the respective support protrusions 31c and 33c of the support brackets 31 and 33. Accordingly, as is shown in FIG. 3, the respective support protrusions 31c and 33c are inserted and supported in the support holes 61c, and therefore, the AC/DC power driving unit 60 and the lens holder 30 are positioned relative to each other. The AC/DC power driving board 63 is fastened by screws to the housing cover 65, to be accommodated in the housing 61. The AC/DC power driving board 63 is electrically connected with the rear driving board 70. Because the AC/DC power driving unit 60 is assembled as one assembly, it can be selectively engaged and disengaged between the rear end of the lens holder 30 and the rear driving board 70.

Figure 4:
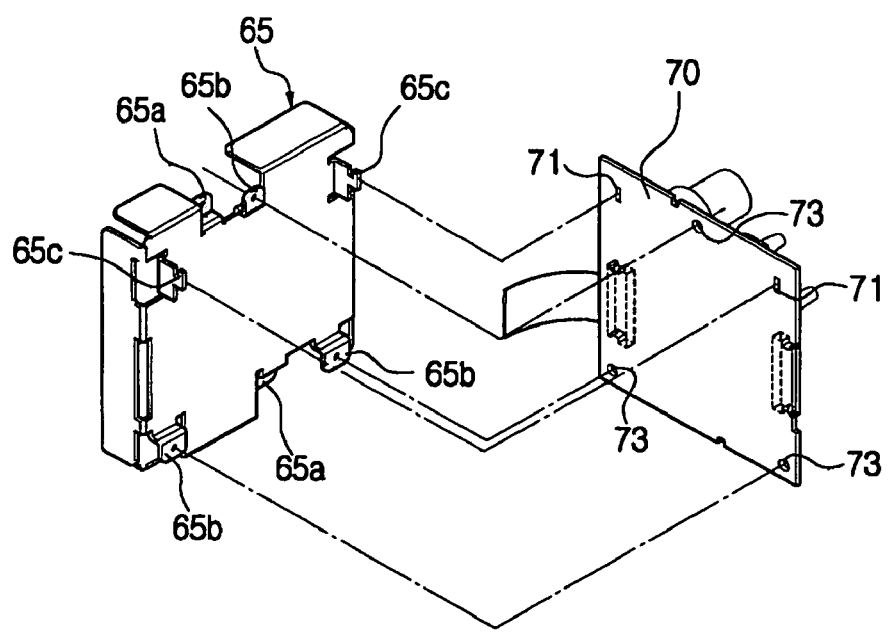
FIG. 4 is a perspective view illustrating a rear driving board and a housing cover of FIG. 1 prior to assembly.

The rear driving board 70 is engaged with a rear side of the housing cover 63 by screws. The rear casing 15 and the rear driving board 70 are altogether engaged with the housing cover 65 by screws. Referring to FIG. 4, screw fastening parts 65a are provided on rear surface of the housing cover 65 at upper and lower sides, to fasten the housing cover 65 to the housing 61 together with the AC/DC power driving board 63. The housing cover 65 also has three second screw fastening parts 65b to fasten the housing cover 65 to the rear driving board 70 and the rear casing 150 by screws: one located on the upper portion, and two on lower sides of the housing cover 65. The second screw fastening parts 65b are provided in locations corresponding to the respective second fastening parts 31b and 33b of the support brackets 31 and 33. Accordingly, even with the omission of the AC/DC power driving unit 60, the rear driving board 70 and the rear casing 15 are easily assembled to the lens holder 30.

A pair of protruding supports 65c are positioned on the housing cover 65 to adjust a position of the rear driving board 70 and also hold the rear driving board 70 in position. The protruding supports 65c have the same function as the respective support protrusions 31c and 33c of the support brackets 31 and 33, and are provided in corresponding locations on the housing cover 65.

A pair of support holes 71 are defined in the rear driving board 70 to receive the protruding supports 65c therein. The rear driving board 70 has screw holes 73 (shared screw holes) corresponding to the second screw fastening parts 65b. Additionally, the screw holes 73 can be engaged with the respective second fastening parts 31b and 33b of the support brackets 31 and 33, such that the rear driving board 70 can be directly engaged with the lens holder 30 when the AC/DC power driving unit 60 is not employed.

Figure 5:
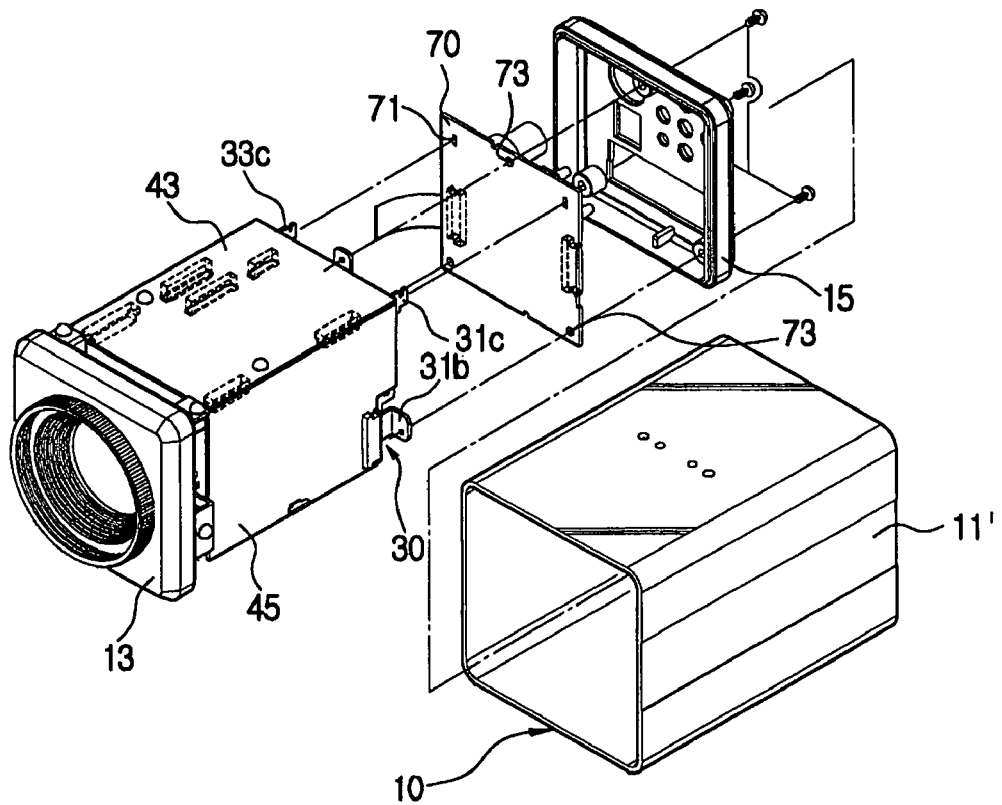
FIGS. 5 and 6 are perspective views illustrating the CCD camera apparatus of FIG. 1 omitting an AC power driving unit.
Figure 6:
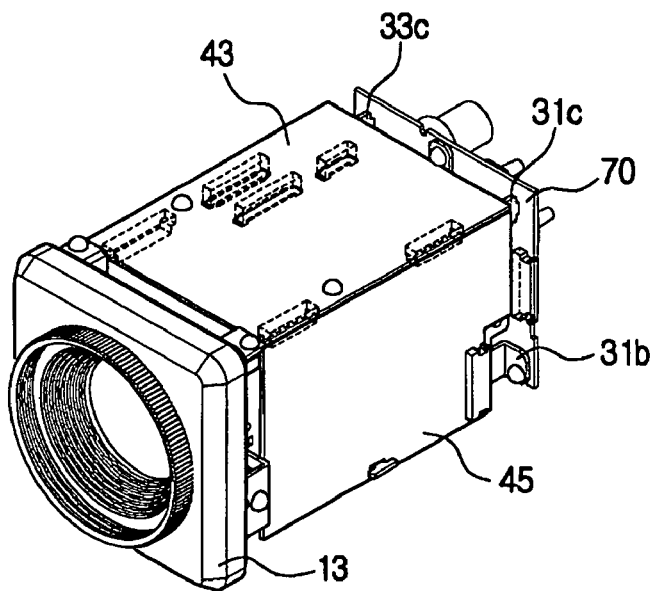

Referring to FIGS. 5 and 6, the rear driving board 70 and the rear casing 15 may be directly engaged with the rear driving board 70, with the omission of the AC/DC power driving unit 60. In this case, the casing body 11 is replaced with a casing body 11' having a length that is smaller than a length of the casing body 11, approximately by an axial length of the AC/DC power driving unit 60.

As is described above, the rear driving board 70, together with the rear casing 15, may be directly engaged with the lens holder 30, or indirectly engaged, that is, to the rear side of the AC/DC power driving unit 60. Thus, the AC/DC power driving unit 60 may be selectively installed. That is, the AC/DC power driving unit 60 may be installed between the lens holder 30 and the rear driving board 70, or omitted. In the area where the DC power is generally used, the CCD camera apparatus can be assembled, with the omission of the AC/DC power driving unit 60. FIG. 6 shows a structure of the CCD camera apparatus that omits the AC/DC power driving unit 60.

On the contrary, the AC/DC power driving unit 60 is assembled in the CCD camera apparatus for use in an area where AC power is generally used. Therefore, in accordance with the type of power generally used in a given area, the AC/DC power driving unit 60 can be employed or not. To use the AC/DC power driving unit 60, the case body 11' may be changed to another that has a proper corresponding length. As the compatibility of the camera apparatus enhances, and manufacturing process is simplified, overall costs of manufacturing the CCD camera apparatuses are reduced.

As is described above in a few exemplary embodiments of the present invention, the CCD camera apparatus according to the present invention has the structure that allows selective employment of an AC/DC power driving unit, and therefore, the manufacturer of the camera apparatus can adaptively assemble the camera apparatuses in accordance with the type of electricity being used.

As is described above, the overall manufacturing costs and unit price can be greatly reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A CCD camera apparatus for use with AC and DC power, comprising:
    a casing having a zoom lens module installed therein;
    a lens holder installed in the casing, and supporting the zoom lens module;
    a DC power driving board supported on the lens holder;
    a CCD module connected to a first end of the zoom lens module;
    an end driving board configured to be detachably engaged to a first end of an AC/DC power driving unit selectively engaged with a first end of the lens holder in a detachable manner and directly engageable to and disengageable from the first end of the lens holder, wherein the lens holder comprises:
    a first support bracket; and
    a second support bracket oppositely engaged with the first support bracket, the first and the second support brackets surrounding an outer side of the zoom lens module and supporting the zoom lens module, the first and the second support brackets each comprising:
    a first fastening part to fasten the AC/DC power driving unit, and
    a second fastening part to fasten the end driving board.

2. The CCD camera apparatus of claim 1, wherein the end driving board has a shared screw hole to selectively fasten the end driving board to one of the second fastening part or the AC/DC power driving unit, using a screw.

3. A CCD camera apparatus for use with AC and DC power, comprising:
    a casing having a zoom lens module installed therein;
    a lens holder installed in the casing, and supporting the zoom lens module;
    a DC power driving board supported on the lens holder;
    a CCD module connected to a first end of the zoom lens module;
    an AC/DC power driving unit; and
    an end driving board configured to detachably engage a first end of the AC/DC power driving unit selectively engaged with a first end of the lens holder in a detachable manner and configured to be directly engageable to and disengageable from the first end of the lens holder,
    wherein the first end of the lens holder is configured to be connected to both the first end of the AC/DC power driving unit and the end driving board, and
    wherein the AC/DC power driving unit comprises:
    a housing assembled to the lens holder;
    an AC/DC power driving board disposed in the housing, and electrically connected with the end driving board, the AC/DC power driving board converting AC power supply into DC power; and
    a housing cover engaged to a first end of the housing in a manner that covers the AC/DC power driving board, and supporting the end driving board, and
    wherein the housing cover comprises:
    a first screw fastening part to screw-fasten with both the housing and the AC/DC prower driving board altogether; and
    a second screw fastening part to screw-fasten with the end driving board.

4. A CCD camera apparatus for use with AC and DC power, comprising:
    a casing having a zoom lens module installed therein;
    a lens holder installed in the casing, and supporting the zoom lens module;
    a DC power driving board supported on the lens holder;
    a CCD module connected to a first end of the zoom lens module;
    an AC/DC power driving unit; and
    an end driving board configured to detachably engage a first end of the AC/DC power driving unit selectively engaged with a first end of the lens holder in a detachable manner and configured to be directly engageable to and disengageable from the first end of the lens holder,
    wherein the first end of the lens holder is configured to be connected to both the first end of the AC/DC power driving unit and the end driving board, and
    wherein the AC/DC power driving unit comprises:
    a housing assembled to the lens holder;
    an AC/DC power driving board disposed in the housing, and electrically connected with the end driving board, the AC/DC power driving board converting AC power supply into DC power; and
    a housing cover engaged to a first end of the housing in a manner that covers the AC/DC power driving board, and supporting the end driving board, and
    wherein the housing cover comprises a pair of support protrusions determining a position of the end driving board and holding the end driving board in the position; and
    the end driving board has a pair of support holes corresponding to the support protrusions.

5. The CCD camera apparatus of claim 1, wherein:
the first and the second support brackets each comprise a plurality of protruding supports determining a position of one of the end driving board or the AC/DC power driving unit as comprised within the CCD camera apparatus, and also holding the one of the end driving board or the AC/DC power driving unit in the position; and
the end driving board and the AC/DC power driving unit respectively have a plurality of support holes corresponding to the protruding supports.

6. The CCD camera apparatus of claim 5, wherein the AC/DC power driving unit comprises a plurality of supporting protrusions corresponding to the support holes of the rear driving board.

7. A CCD camera apparatus, comprising:
a casing;
a zoom lens module installed in the casing;
a lens holder installed in the casing, and supporting the zoom lens module;
a DC power driving board supported on the lens holder;
a CCD module connected to a first end of the zoom lens module; and
an end driving board, electrically connected with the DC power driving board, and configured to be selectively connected to a first end of an AC/DC power driving unit selectively connected to a first end of the lens holder and the first end of the lens holder when the AC/DC power driving unit is not connected to the first end of the lens holder,
wherein the lens holder comprises:
a first support bracket surrounding and supporting a first portion of the zoom lens module; and
a second support bracket surrounding and supporting a second portion of the zoom lens module opposite the first portion, the first and second support brackets being approximately symmetrically engaged.

8. The CCD camera apparatus according to claim 7, further comprising:
a lens driving circuit board controlling driving of the zoom lens module and being supported on a portion of the second support bracket; and
a DSP circuit board processing video signals and being supported on a portion of the first support bracket.

9. The CCD camera apparatus according to claim 7, further comprising the AC/DC power driving unit connected to the first end of the lens holder, wherein:
each of the first and second support brackets has first and second fastening parts and a support protrusion;
to selectively position the AC/DC power driving unit with respect to the lens holder, and connect the AC/DC power driving unit therewith, the AC/DC power driving unit has
engagement parts corresponding with the respective first fastening parts, and
support holes corresponding with the respective support protrusions; and
to selectively position the end driving board with respect to the lens holder, and connect the end driving board therewith, the end driving board has
screw holes corresponding with the respective second fastening parts, and
support holes corresponding with the respective support protrusions.

10. The CCD camera apparatus according to claim 9, wherein:
to selectively position the end driving board with respect to the AC/DC power driving unit, and connect the end driving board therewith, the AC/DC power driving unit has
a plurality of protruding supporting parts corresponding with the support holes of the end driving board, and
a plurality of screw fastening parts corresponding with the screw holes of the end driving board.

11. The CCD camera apparatus according to claim 10, wherein the AC/DC power driving unit comprises:
a housing selectively connected at a first end thereof to the first end of the lens holder;
an AC/DC power driving board disposed within the housing; and
a housing cover, connected to a second end of the housing opposite the first end,
wherein the plurality of protruding supporting parts and the plurality of screw fastening parts are positioned on the housing cover.

* * * * *

UNITED STATES PATENT AND TRADEMARK OFFICE
CERTIFICATE OF CORRECTION

PATENT NO. : 7,466,360 B2  Page 1 of 1
APPLICATION NO. : 10/963729
DATED : December 16, 2008
INVENTOR(S) : Woon-ho Lee It is certified that error appears in the above-identified patent and that said Letters Patent is hereby corrected as shown below:

On the title page item [57]:
Column 2 (Abstract), Line 2, change "CCD," to --CCD--.

Column 6, Line 31, change "prower" to --power--.

Signed and Sealed this

Twenty-fourth Day of March, 2009

JOHN DOLL
*Acting Director of the United States Patent and Trademark Office*